United States Patent
Ohnishi et al.

(10) Patent No.: US 8,952,997 B2
(45) Date of Patent: Feb. 10, 2015

(54) IMAGE PROCESSOR

(75) Inventors: Kohji Ohnishi, Kobe (JP); Teruhiko Kamibayashi, Kobe (JP); Takeo Matsumoto, Kobe (JP); Shizuka Tamura, Kobe (JP); Tomoyuki Fujimoto, Kobe (JP)

(73) Assignee: Fujitsu Ten Limited, Kobe (JP)

( * ) Notice: Subject to any disclaimer, the term of this patent is extended or adjusted under 35 U.S.C. 154(b) by 230 days.

(21) Appl. No.: 13/369,859

(22) Filed: Feb. 9, 2012

(65) Prior Publication Data

US 2012/0212518 A1  Aug. 23, 2012

(30) Foreign Application Priority Data

Feb. 23, 2011  (JP) ................. 2011-037264

(51) Int. Cl.
*G09G 5/10* (2006.01)
*G06F 3/147* (2006.01)
*G09G 5/00* (2006.01)

(52) U.S. Cl.
CPC ................ *G06F 3/147* (2013.01); *G09G 5/003* (2013.01); *G09G 2320/0613* (2013.01); *G09G 2320/062* (2013.01); *G09G 2320/0626* (2013.01); *G09G 2320/066* (2013.01); *G09G 2320/0666* (2013.01); *G09G 2340/10* (2013.01); *G09G 2340/14* (2013.01); *G09G 2360/144* (2013.01); *G09G 2370/20* (2013.01); *G09G 2380/10* (2013.01)
USPC ....................................... 345/690

(58) Field of Classification Search
USPC ........... 345/690–699; 340/461; 382/167, 311
See application file for complete search history.

(56) References Cited

U.S. PATENT DOCUMENTS

| | | | |
|---|---|---|---|
| 2009/0109232 A1* | 4/2009 | Kerofsky | 345/589 |
| 2009/0256867 A1* | 10/2009 | Girardelli | 345/690 |
| 2010/0091034 A1 | 4/2010 | Matsumoto et al. | |
| 2010/0120471 A1 | 5/2010 | Uchikawa et al. | |
| 2010/0188325 A1* | 7/2010 | Inoue | 345/156 |
| 2010/0245071 A1* | 9/2010 | Fujisawa et al. | 340/461 |
| 2011/0035099 A1* | 2/2011 | Kobayashi | 701/36 |
| 2012/0002903 A1* | 1/2012 | Wilensky | 382/311 |
| 2013/0114894 A1* | 5/2013 | Yadav et al. | 382/167 |
| 2013/0231163 A1 | 9/2013 | Uchikawa et al. | |

FOREIGN PATENT DOCUMENTS

| | | |
|---|---|---|
| JP | A-2000-298466 | 10/2000 |
| JP | A-2009-276425 | 11/2009 |
| JP | A-2010-72141 | 4/2010 |
| JP | A-2011-203342 | 10/2011 |
| WO | WO 2008/117784 A1 | 10/2008 |
| WO | WO 2009/101802 A1 | 8/2009 |

OTHER PUBLICATIONS

Notice of Rejection dated Oct. 7, 2014 from Japanese Patent Application No. 2011-037264 (English-language translation only).

* cited by examiner

*Primary Examiner* — Seokyun Moon
*Assistant Examiner* — Peijie Shen
(74) *Attorney, Agent, or Firm* — Oliff PLC

(57) ABSTRACT

An image processor receives information of a type of an input image, and performs a correction to the input image in accordance with an illuminance in an area near a display that displays the input image and the received information of the type of the input image.

2 Claims, 13 Drawing Sheets

| IMAGE TYPE | DIRECT-RAY CORRECTION PARAMETER | | | | | | |
|---|---|---|---|---|---|---|---|
| | VISIBILITY | CONTRAST | SATURATION | BLEND RATE CURVE | BACKLIGHT | ... | ... |
| CAMERA | HIGH | HIGH | MIDDLE | (curve) | HIGH | ... | ... |
| DVD | MIDDLE | LOW | LOW | (curve) | MIDDLE | ... | ... |
| NAVIGATION SYSTEM | LOW | MIDDLE | MIDDLE | (curve) | MIDDLE | ... | ... |
| ⋮ | ⋮ | ⋮ | ⋮ | ⋮ | ⋮ | ⋮ | ⋮ |

| IMAGE TYPE | DIRECT-RAY CORRECTION PARAMETER ||||| |
|---|---|---|---|---|---|---|
| | VISIBILITY | CONTRAST | SATURATION | BLEND RATE CURVE | BACKLIGHT | ... |
| CAMERA | HIGH | HIGH | MIDDLE | | HIGH | ... |
| DVD | MIDDLE | LOW | LOW | | MIDDLE | ... |
| NAVIGATION SYSTEM | LOW | MIDDLE | MIDDLE | | MIDDLE | ... |
| ... | ... | ... | ... | ... | ... | ... |

FIG.3

| IMAGE TYPE | VISIBILITY | CONTRAST | SATURATION | BLEND RATE CURVE | BACKLIGHT | ... |
|---|---|---|---|---|---|---|
| CAMERA | A | A | A | A | A | ... |
| DVD | A | A | A | A | A | ... |
| NAVIGATION SYSTEM | A | A | A | A | A | ... |
| ⋮ | ⋮ | ⋮ | ⋮ | ⋮ | ⋮ | ⋮ |

FIG.6A

| IMAGE TYPE | VISIBILITY | CONTRAST | SATURATION | BLEND RATE CURVE | BACKLIGHT | ... |
|---|---|---|---|---|---|---|
| CAMERA | A | A | A | NA | NA | ... |
| DVD | A | A | A | NA | NA | ... |
| NAVIGATION SYSTEM | A | A | A | NA | NA | ... |
| ⋮ | ⋮ | ⋮ | ⋮ | ⋮ | ⋮ | ⋮ |

FIG.6B

| IMAGE TYPE | VISIBILITY | CONTRAST | SATURATION | BLEND RATE CURVE | BACKLIGHT | ... |
|---|---|---|---|---|---|---|
| CAMERA | NA | NA | NA | A | NA | ... |
| DVD | NA | NA | NA | A | NA | ... |
| NAVIGATION SYSTEM | NA | NA | NA | A | NA | ... |
| ⋮ | ⋮ | ⋮ | ⋮ | ⋮ | ⋮ | ⋮ |

FIG.6C

| IMAGE TYPE | VISIBILITY | CONTRAST | SATURATION | BLEND RATE CURVE | BACKLIGHT | ... |
|---|---|---|---|---|---|---|
| CAMERA | NA | NA | NA | NA | A | ... |
| DVD | NA | NA | NA | NA | A | ... |
| NAVIGATION SYSTEM | NA | NA | NA | NA | A | ... |
| ⋮ | ⋮ | ⋮ | ⋮ | ⋮ | ⋮ | ⋮ |

FIG.6D

| IMAGE TYPE | VISIBILITY | CONTRAST | SATURATION | BLEND RATE CURVE | BACKLIGHT | ... |
|---|---|---|---|---|---|---|
| CAMERA | H | H | H | H | H | ... |
| DVD | A | A | A | A | A | ... |
| NAVIGATION SYSTEM | A | A | A | A | A | ... |
| ⋮ | ⋮ | ⋮ | ⋮ | ⋮ | ⋮ | ⋮ |

FIG.6E

IMAGE PROCESSOR

BACKGROUND OF THE INVENTION

1. Field of the Invention

The invention relates to an image processor that can provide ensured visibility even under direct sunlight.

2. Description of the Background Art

Conventionally-known image display apparatus included in a car navigation system or the like display navigation data to navigate to a destination, DTV (Digital Television) broadcast, or an image captured by an in-vehicle camera on the display apparatus screen.

Such image display apparatus correct an image so as to ensure visibility of the displayed image on the display screen which is exposed to outside light.

One of the well-known technologies for correcting an image in such a case is to correct contrast, luminance of a backlight and others in accordance with illuminance of outside light detected by an illuminometer. Generally, an image processing circuit included in image display apparatus implements such image correction.

The image display apparatus performs a stronger correction when it is exposed to stronger outside light such as direct sunlight. In many cases, the image on which such a stronger correction has been performed shows an incongruity in color tone compared to the original image before the correction. Therefore, the image display apparatus generally performs a moderate correction not to show such an incongruity.

However, in the technology described above, since the correction is controlled so that the incongruity is not shown regardless of the type of an input image, there are some cases where visibility of the display image cannot be ensured, while ensuring the visibility has to be given priority. An example of such a case is seen when the existence of a pedestrian or an obstacle near a vehicle has to be confirmed based on the image obtained by an in-vehicle camera.

Therefore, the subject is how to provide the ensured visibility of the display image even under direct sunlight, especially in the case of display of the input image requiring the ensured visibility.

SUMMARY OF THE INVENTION

According to one aspect of the invention, an image processor includes a type receiver that receives information of a type of an input image, and a corrector that performs a correction to the input image in accordance with an illuminance in an area near a display that displays the input image and the information of the type of the input image.

Since the image processor performs the correction to the input image in accordance with the illuminance in the area near the display and the information of the type of the input image, the visibility of the display can be ensured appropriately.

According to another aspect of the invention, the corrector changes a level of the correction for the input image in accordance with the information of the type of the input image.

Since the level of the correction for the input image is changed in accordance with the information of the type of the input image, appropriate correction can be performed in accordance with the type of the input image.

Therefore, the object of the invention is to provide an image processor that can ensure visibility of a display image even under direct sunlight, especially in the case the visibility of the input image displayed on a display screen must be ensured.

These and other objects, features, aspects and advantages of the invention will become more apparent from the following detailed description of the invention when taken in conjunction with the accompanying drawings.

BRIEF DESCRIPTION OF THE DRAWINGS

FIG. 3 shows example settings of direct-ray correction data.

FIG. 6A shows an application pattern example of direct-ray correction parameters.

FIG. 6B shows another application pattern example of the direct-ray correction parameters.

FIG. 6C shows another application pattern example of the direct-ray correction parameters.

FIG. 6D shows another application pattern example of the direct-ray correction parameters.

FIG. 6E shows another application pattern example of the direct-ray correction parameters.

DESCRIPTION OF THE EMBODIMENTS

Based on attached drawings, here is a detailed description regarding embodiments of image correction (hereafter, referred to as "direct-ray correction") methods of the invention used when a display screen is exposed to outside light. First, described based on FIG. 1A and FIG. 1B will be the outlines of direct-ray correction methods of the conventional technology and the invention. Next, described based on FIGS. 2 to 12 will be image processing circuits and image display apparatuses that adopt the direct-ray correct methods of the invention.

1. Outline of Direct-Ray Correction Method

Figure 1A:
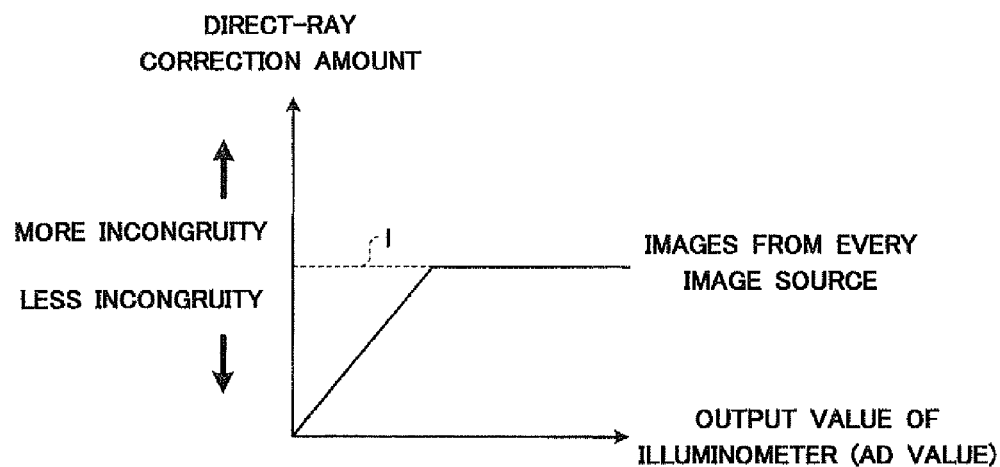
FIG. 1A shows an outline of a direct-ray correction method of a conventional technology.
Figure 1B:
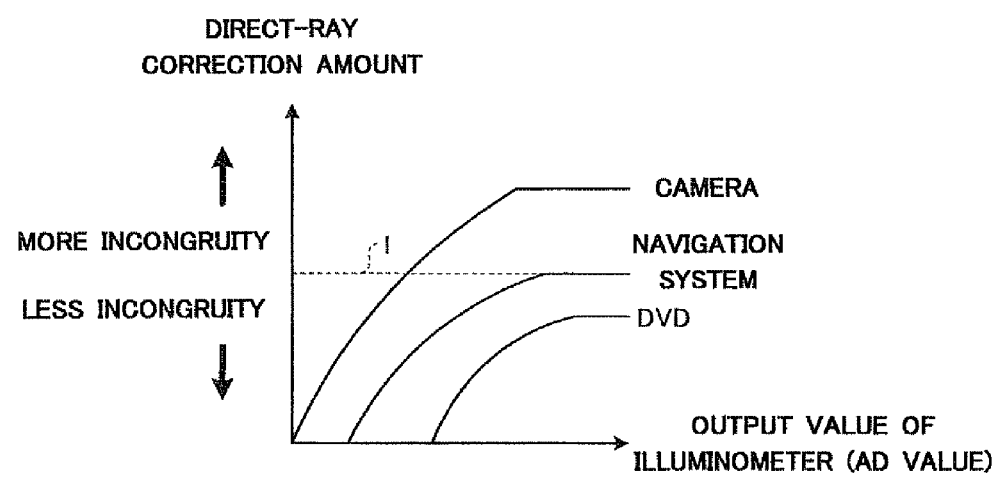
FIG. 1B shows an outline of a direct-ray correction method of the invention.

First, described based on FIG. 1A and FIG. 1B will be the outlines of direct-ray correction methods of the conventional technology and the invention. FIG. 1A shows the outline of the direct-ray correction method of the conventional technology. FIG. 1B shows the outline of the direct-ray correction method of the invention.

The direct-ray correction method of the conventional technology varies a direct-ray correction amount for an input image based on the output value of an illuminometer (hereinafter, referred to as "AD value"). As shown in FIG. 1A, the direct-ray correction method of the conventional technology corrects equally the images from every image source. The output value of the illuminometer is the digital value converted from the analog value detected by the illuminometer.

As shown in FIG. 1A, the more the direct-ray correction amount increases, the more an incongruity in color tone is shown (refer to "More incongruity" in FIG. 1A). Thus, the direct-ray correction method of the conventional technology limits the direct-ray correction amount to the one for a certain level of the AD value (refer to a dashed line I in FIG. 1A).

That is, visual impressions such as color tone are given priority over visibility even in the case where the visibility of an image on a display screen is lowered because the screen is exposed to outside light.

Thus, the direct-ray correction method of the conventional technology hardly ensures visibility under direct sunlight even in the case where the visibility of the display image must be ensured, such as when the existence of a pedestrian or an obstacle near a vehicle has to be confirmed based on the image obtained by an in-vehicle camera.

However, the direct-ray correction method of the invention changes the correspondence relations between the AD values and the direct-ray correction amounts (hereinafter, referred to as "direct-ray correction amount curve"), in accordance with the type of the input image.

Concretely, as shown in FIG. 1B, the direct-ray correction curves are set for each of the types of input images such as of in-vehicle camera, navigation information and DVD. The direct-ray correction is implemented based on the direct-ray correction amount calculated based on the corresponding direct-ray correction amount curve (refer to "camera," "navigation" and "DVD" in FIG. 1B).

In an example, as shown in the direct-ray correction amount curve of "camera" in FIG. 1B, the direct-ray correction amount above the upper limit (refer to the dashed line I in FIG. 1A and FIG. 1B) set in the conventional method is available in the direct-ray correction method of the invention.

That is, when the visibility of the input image displayed on a display screen must be given priority, ensuring the visibility is given priority over the visual impressions such as color tone even when the AD value is large (in a case under direct sunlight).

The examples in FIG. 1A and FIG. 1B are the methods where the direct-ray correction amount is calculated by use of the direct-ray correction amount curve. However, in the actual direct-ray correction method of the invention, the direct-ray correction amount is calculated by use of direct-ray correction parameters prepared for each of the types of input images.

The direct-ray correction parameters include "visibility parameter" relevant to visibility correction, "contrast parameter" relevant to contrast correction, "saturation parameter" relevant to saturation correction, "blend rate curve" showing the relation between the AD value and the blend rate of an image-after-correction to an image-before-correction, and "backlight parameter" relevant to luminance adjustment of a backlight source. The respective details of these direct-ray correction parameters will be described based on FIGS. 3 to 6.

As above, the direct-ray correction method of the invention uses different direct-ray correction curves according to the type of the input image from an image source such as an in-vehicle camera, navigation data or a DVD. Therefore, when the visibility of the input image displayed on a display screen must be ensured, the direct-ray correction method of the invention can provide the ensured visibility even under direct sunlight.

2. First Embodiment 2-1. Configuration of Image Display

Figure 2:
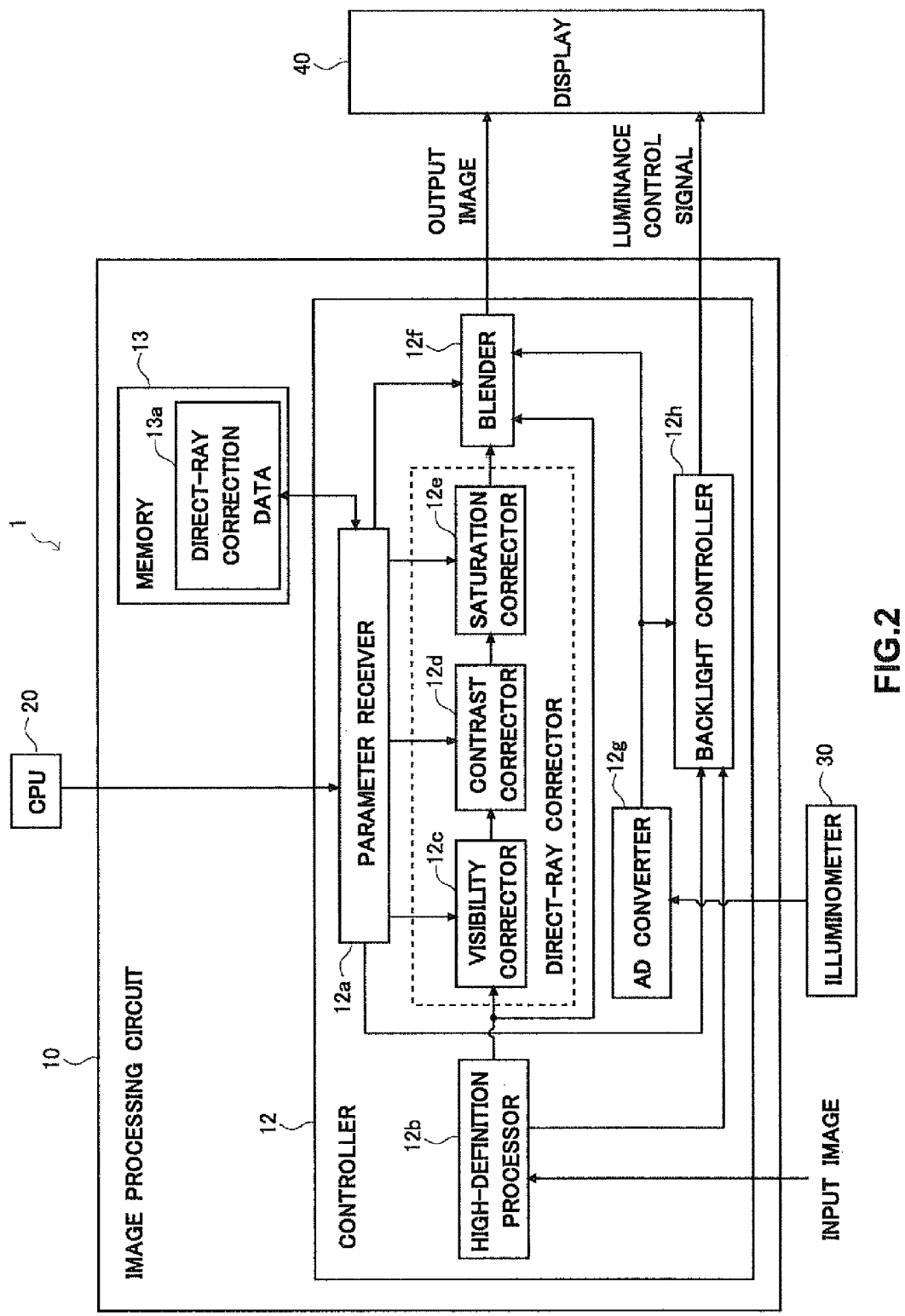
FIG. 2 shows a block diagram of a configuration of an image display apparatus of the first embodiment.

Hereafter, the image display apparatus adopting the direct-ray correction method of the invention will be described in detail. FIG. 2 shows a block diagram of a configuration of image display apparatus 1 of the first embodiment.

As shown in FIG. 2, the image display apparatus 1 includes a CPU (Central Processing Unit) 20, an illuminometer 30, a display 40 and an image processing circuit (image processor) 10.

The CPU 20 transmits set data of direct-ray correction parameters described later to the image processing circuit 10 at an initial operation step on the image processing circuit 10, such as when the power is turned on. The CPU 20 also transmits the type data of the input image to the image processing circuit 10, such as when an input image is switched.

The type data of input images includes various distinctions according to the image sources such as an in-vehicle camera and navigation data. In the description of the first embodiment, the type data of input images corresponds to the distinctions according to the image sources.

The illuminometer 30 that is disposed near a display 40 outside of the image processing circuit 10 is a detection device to detect illuminance in the area near the display 40 in an analog value.

The display 40 displays output images. Here, the display 40 of the first embodiment is a liquid crystal display including backlight sources.

The image processing circuit 10 that includes a controller 12 and a memory 13 can be configured as an ASIC (Application Specific Integrated Circuit). FIG. 2 shows the components only required for description of the characteristics of the image processing circuit 10, and shows no general components.

The controller 12 that controls the entire image processing circuit 10 includes a parameter receiver 12a (including a type receiver and a data receiver), a high-definition processor 12b, a visibility corrector 12c, a contrast corrector 12d, a saturation corrector 12e, a blender 12f, an AD converter 12g and a backlight controller 12h.

The parameter receiver 12a is a processor that causes the memory 13 to store a set data of the direct-ray correction parameters as direct-ray correction data 13a when the set data of direct-ray correction parameters is transmitted from the CPU 20.

The parameter receiver 12a also, when the type data of the input image is transmitted from the CPU 20, receives from the direct-ray correction data 13a the set data of direct-ray correction parameters corresponding to the type. Then, the parameter receiver 12a transmits the respective data of the direct-ray correction parameters (such as a "visibility parameter" described above) corresponding to each of the respective processors of the visibility corrector 12c, the contrast corrector 12d, the saturation corrector 12e, the blender 12f and the backlight controller 12h from the received set data of direct-ray correction parameters, respectively to the processors of 12c, 12d, 12e, 12f and 12h.

The high-definition processor 12b is a processor that converts the input image into a high-definition image and outputs the converted high-definition image to the visibility corrector 12c, the blender 12f and the backlight controller 12h. In the high-definition processing, mainly outline correction and color correction are applied on the input images. Hereafter, the converted high-definition image is referred to as "image-before-correction." The output system to the blender 12f may be divided from the output system to the visibility corrector 12c at a stage prior to the visibility corrector 12c.

The visibility corrector 12c is a processor that corrects the image-before-correction input from the high-definition processor 12b based on the data of "visibility parameter" transmitted from the parameter receiver 12a, and that outputs the input image after the correction to the contrast corrector 12d.

The contrast corrector 12d is a processor that corrects the input image after the visibility correction input from the visibility corrector 12c based on the data of "contrast parameter" transmitted from the parameter receiver 12a, and outputs the input image after the correction to the saturation corrector 12e.

The saturation corrector 12e is a processor that corrects the input image after the contrast correction input from the contrast corrector 12d based on the data of "saturation parameter" transmitted from the parameter receiver 12a, and outputs the input image after the correction (hereinafter, referred to as "image-after-correction") to the blender 12f.

As shown in a rectangle part inside dotted border lines, the visibility corrector 12c, the contrast corrector 12d and the saturation corrector 12e function collectively as a direct-ray corrector in the image processing circuit 10 of the first embodiment.

The blender 12f is a processor that blends the image-after-correction input from the saturation corrector 12e and the image-before-correction input from the high-definition processor 12b, and generates the output image by blending the images based on the data of "blend rate curve" transmitted from the parameter receiver 12a and the AD value input from the AD converter 12g. The blender 12f also outputs the generated output images to the display 40 disposed outside the image processing circuit 10.

The AD converter 12g is a processor that converts the detection value of the illuminometer 30 from an analog value to a digital value (AD value), and that outputs the converted value to the blender 12f. The AD converter 12g also outputs the AD value to the backlight controller 12h. The output system to the backlight controller 12h may be divided from the output system to the blender 12f at a stage posterior to the AD convertor 12g.

The backlight controller 12h is a processor that generates a luminance control signal to control the luminance of the backlight sources included in the display 40 based on the data of "backlight parameter" transmitted from the parameter receiver 12a, image-before-correction input from the high-definition processor 12b and the AD value input from the AD converter 12g. The backlight controller 12h also outputs the generated luminance control signal to the display 40.

The memory 13 includes a memory device such as a nonvolatile memory or a register and stores the direct-ray correction data 13a. The direct-ray correction data 13a is set data that includes the parameters relevant to the direct-ray correction used by respective processors including the visibility corrector 12c, the contrast corrector 12d, the saturation corrector 12e, the blender 12f and the backlight controller 12h.

The respective parameters included in the direct-ray correction data 13a are stored corresponding to each of the types of the input images. As above, the direct-ray correction data 13a is stored by the parameter receiver 12a at the initial operation step on the image processing circuit 10 such as when the power is turned on. However, the predetermined parameters may be stored in advance based on experimental results or the like.

Here, concrete setting examples of the direct-ray correction data 13a are described based on FIG. 3. FIG. 3 shows the setting examples of the direct-ray correction data 13a.

As shown in FIG. 3, the direct-ray correction data 13a includes an item of "image type" and an item of "direct-ray correction parameter." Further, the item of "direct-ray correction parameter" includes an item of "visibility," an item of "contrast," an item of "saturation," an item of "blend rate curve" and an item of "backlight."

The item of "image type" indicates a set value for specifying an image type (image source) such as "camera," "DVD" or "navigation system." FIG. 3 indicates examples where text values such as "camera" are stored, but the form of the set values is not limited to the ones in the examples. The same is true for other items described later.

The direct-ray correction data 13a is set corresponding to each of the image types. That is, the set value stored in the item of "image type" is used as a primary key when the parameter receiver 12a receives from the direct-ray correction data 13a a set data of the direct-ray correction parameters corresponding to the type of the input image.

Next, individual items included in the item of "direct-ray correction parameter" will be described. In the examples of FIG. 3, the individual items other than the item of "blend rate curve" store set values such as "high," "middle" and "low." The set values indicate direct-ray correction amounts—i.e., strength of the direct-ray correction—, simply in three levels, "high">"middle">"low."

The item of "visibility" stores "visibility parameter" relevant to the visibility correction. The set examples of FIG. 3 show the respective levels of visibility corrections as follows: "high" level for the image type of "camera;" "middle" level for the image type of "DVD;" and "low" level for the image type of "navigation system."

The item of "contrast" stores "contrast parameter" relevant to the contrast correction. The set examples of FIG. 3 show the respective levels of contrast corrections as follows: "high" level for the image type of "camera;" "low" level for the image type of "DVD;" and "middle" level for the image type of "navigation system."

The item of "saturation" stores "saturation parameter" relevant to the saturation correction. The set examples of FIG. 3 show the respective levels of saturation corrections as follows; "middle" level for the image type of "camera;" "low" level for the image type of "DVD;" and "middle" level for the image type of "navigation system."

Described later based on FIG. 4. will be the concrete visibility correction based on "visibility parameter," the concrete contrast correction based on "contrast parameter" and the concrete saturation correction based on "saturation parameter."

The item of "blend rate curve" stores "blend rate curve" that shows relation between the AD value and the blend rate of the image-after-correction to the image-before-correction. The set examples of FIG. 3 show the different blend rate curves stored for individual image types. The blend rate curve will be described later in detail based on FIG. 5.

The item of "backlight" stores "backlight parameter" relevant to the luminance correction of backlight sources. The set examples of FIG. 3 show the respective levels of luminance corrections of backlight sources as follows: "high" level for the image type of "camera;" "middle" level for the image type of "DVD;" and "middle" level for the image type of "navigation system."

Setting respective parameters relevant to the direct-ray correction for each image type as above enables visibility to be ensured as a priority even in the case where a display is exposed to outside light regarding, for example, the in-vehicle-camera-captured-image that deeply influences vehicle safety. That is, this setting method allows visibility to be ensured even under direct sunlight, when the visibility of the display image must be ensured.

The examples of FIG. 3 show the strength of direct-ray correction simply in three levels of "high," "middle" and "low." However, the levels and their forms are not limited to the ones in the examples. The strength may be indicated in multiple levels more than the three levels or in numbers of different forms, such as "1," "2" and "3." Hereinafter, the strength of the direct-ray correction is indicated in the three levels of "high," "middle" and "low," the same as the description in FIG. 3.

2-2. Operation of Direct-Ray Corrector

Figure 4A:
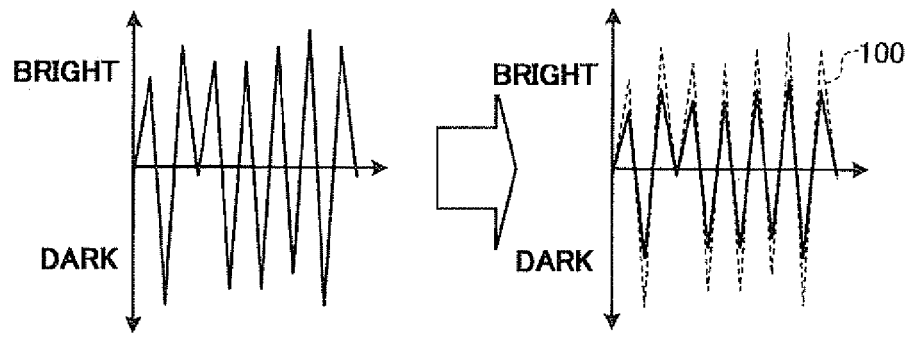
FIG. 4A shows an outline of an operation example of a visibility corrector.
Figure 4B:
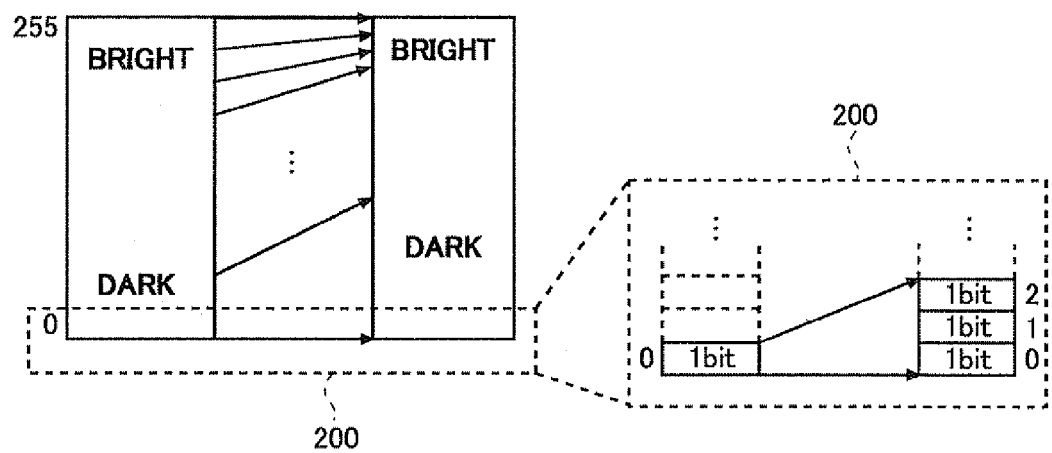
FIG. 4B shows an outline of an operation example of a contrast corrector.
Figure 4C:
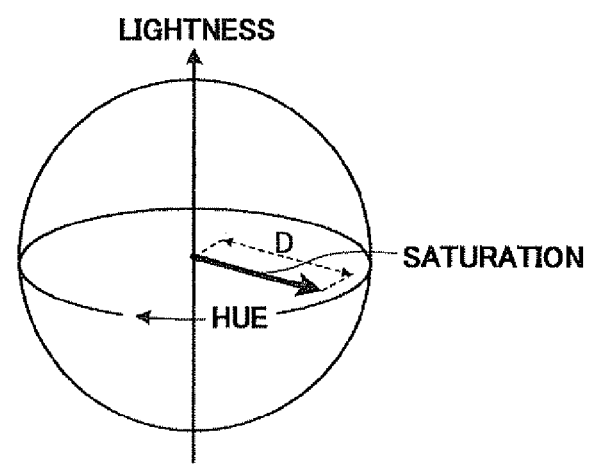
FIG. 4C shows an outline of an operation example of a saturation corrector.

Next, operation examples of the visibility corrector 12c, the contrast corrector 12d and the saturation corrector 12e will be described based on FIG. 4A, FIG. 4B and FIG. 4C. FIG. 4A shows an outline of an operation example of the visibility corrector 12c. FIG. 4B shows an outline of an operation example of the contrast corrector 12d. FIG. 4C shows an outline of an operation example of the saturation corrector 12e.

As shown in FIG. 4A, the visibility corrector 12c controls respectively bright components and dark components of an image signal for correction. The control amount is determined based on the data of "visibility correction parameter" transmitted from the parameter receiver 12a. A dashed line 100 in FIG. 4A shows the waveform of the image signal before the visibility correction.

In the case where "visibility correction parameter" is set at "high" level (refer to FIG. 3, hereafter the same), the visibility corrector 12c increases the control amount. In the case where "visibility correction parameter" is set at "low" level, the visibility corrector 12c reduces the control amount. In the case where "visibility correction parameter" is set at "middle" level, the visibility corrector 12c adjusts the control amount to an approximate middle amount between "high" level and "low" level.

As shown in FIG. 4B, the contrast corrector 12d enlarges the allocation for dark contrast within the bit range allocated for contrast expression, while also reducing the allocation for bright contrast for correction. FIG. 4B shows an example of the bit range having 256 bits from bit-0 to bit-255.

In a concrete example of FIG. 4B, as shown in the part inside a rectangle 200 having dotted border lines, the contrast corrector 12d enlarges the allocation of one bit at bit-0 for dark contrast to the allocation of three bits at bit-0, bit-1 and bit-2. Since a total number of the bits is fixed, the allocation for bright contrast is reduced in accordance with the enlargement.

The enlargement amount relevant to the dark contrast and the reduction amount relevant to the bright contrast are determined based on the data of "contrast correction parameter" transmitted from the parameter receiver 12a. That is, in the case where "contrast correction parameter" is set at "high" level, the contrast corrector 12d increases the enlargement amount and the reduction amount. In the case where "contrast correction parameter" is set at "low" level, the contrast corrector 12d reduces the enlargement amount and the reduction amount. In the case where "contrast correction parameter" is set at "middle" level, the contrast corrector 12d adjusts the enlargement amount and the reduction amount to an approximate middle amount between "high" level and "low" level.

FIG. 4C shows a simple and typical color space. The saturation in the color space is represented in a distance D from a lightness axis (so-called achromatic axis).

The saturation corrector 12e enhances the saturation for correction based on the data of "saturation correction parameter" transmitted from the parameter receiver 12a. That is, the saturation corrector 12e extends the distance D based on "saturation correction parameter."

Concretely, in the case where "saturation correction parameter" is set at "high" level, the saturation corrector 12e increases the extension amount of the distance D. In the case where "saturation correction parameter" is set at "low" level, the saturation corrector 12e reduces the extension amount of the distance D. In the case where "saturation correction parameter" is set at "middle" level, the saturation corrector 12e adjusts the extension amount of the distance D to an approximate middle amount between "high" level and "low" level.

Respective methods of the visibility correction in FIG. 4A, the contrast correction in FIG. 4B and the saturation correction in FIG. 4C are only examples. The methods are not limited to them.

Figure 5:
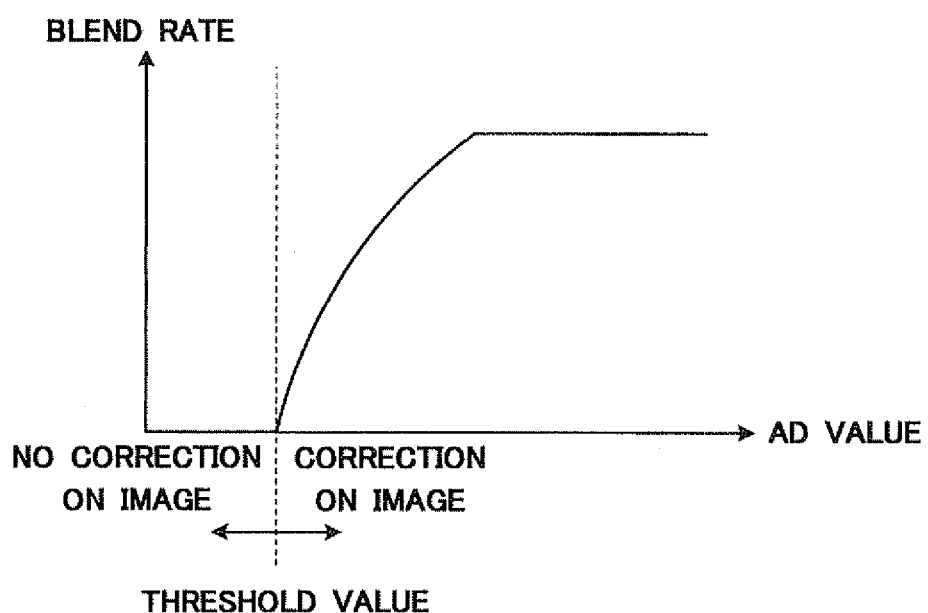
FIG. 5 describes blending at a blender.

Next, blending at the blender 12f will be described based on FIG. 5. FIG. 5 describes blending at the blender 12f. FIG. 5 shows a concrete example of "blend rate curve."

As shown in FIG. 5, "blend rate curve" indicates the relation between the AD value and the blend rate of the image-after-correction to the image-before-correction. The blender 12f blends the image-after-correction and the image-before-correction based on the blend rate calculated by use of the "blend rate curve."

Concretely, as shown in FIG. 5, in the case where the AD value input from the AD converter 12g is at a predetermined threshold value or above, the blender 12f corrects an image. That is, the blender 12f blends the image-before-correction and the image-after-correction (refer to "correction on image" in FIG. 5). In the case where the AD value is less than the predetermined threshold value, the blender 12f does not correct an image (refer to "no correction on image" in FIG. 5).

The image blending is implemented based on the data of "blend rate curve" transmitted from the parameter receiver 12a. That is, the blender 12f blends the image-after-correction to the image-before-correction at the blend rate after calculating the blend rate corresponding to the input AD value in reference to the "blend rate curve."

Then, the blender 12f outputs the blended image to the display 40 as an output image.

FIG. 5 shows an example of "blend rate curve" curving upward (toward a plus direction of the axis of "blend rate" in FIG. 5). Curving upward as above enables earlier rise in image correction. On the other hand, curving downward in "blend rate curve" enables moderate rise in image correction.

The example of FIG. 5 has a predetermined threshold value regarding the AD value, but the threshold value is not always necessary. That is, "blend rate curve" may start from the axis of "blend rate" of FIG. 5 (when AD value=0, "blend rate">0). In such a case, even if the display 40 is not exposed to outside light, a minimum degree of blending may be implemented for ensuring the visibility.

So far, individual direct-ray parameters have been described. Next, the examples of their application patterns will be described based on FIGS. 6A to 6E. FIGS. 6A to 6E show the examples of the application patterns of the direct-ray correction parameters.

The word "application" here means usage of individual direct-ray parameters by the respective processors from 12c to 12f and 12h relevant to direct-ray correction. The "application" may depend on whether the data for application is stored as a parameter in the direct-ray correction data 13a, or whether the individual direct-ray parameters are actually used by the respective processors from 12c to 12f and 12h. The mark "A" stands for "applicable" and the mark "NA" stands for "Not Applicable." The mark "H" indicates that a higher direct-ray correction parameter compared to others is applicable.

The direct-ray correction method of the example shown in FIG. 6A applies all the direct-ray correction parameters in accordance with the image type. In this case, the direct-ray correction method enables detailed setting for each image type in consideration of relations among the parameters, and can provide detailed correction according to the feature for each image type.

The direct-ray correction method of the example shown in FIG. 6l3 applies "visibility parameter" corresponding to the visibility corrector 12c, "contrast parameter" corresponding to the contrast corrector 12d and "saturation parameter" corresponding to the saturation corrector 12e, for correction. In this case, the direct-ray correction method can provide correction specialized in the operation by the direct-ray corrector (refer to FIG. 2) due to ensuring visibility.

The direct-ray correction method of the example shown in FIG. 6C applies only "blend rate curve" corresponding to the blender 12f for correction. In this case, the direct-ray correction method can provide correction specialized in the operation by the blender 12f due to ensuring visibility.

The direct-ray correction method of the example shown in FIG. 6D applies only "backlight parameter" corresponding to the backlight controller 12h for correction. In this case, the direct-ray correction method can provide correction specialized in the operation by the backlight controller 12h due to ensuring visibility. These examples of the application patterns shown in FIGS. 6A to 6D may be combined for a direct-ray correction method.

Setting higher direct-ray correction parameters is preferable for in-vehicle cameras or the like closely related to vehicle safety, compared to other image types. Thus, as shown in FIG. 6E, in the case of a camera for the image type, setting higher parameters compared to other image types is preferable.

This allows visibility to be ensured even under direct sunlight in the case where visibility of the display image must be ensured, such as when the existence of a pedestrian or an obstacle near a vehicle has to be confirmed. That is, this enhances vehicle safety.

2-3. Processing on Image Processing Circuit

Figure 7:
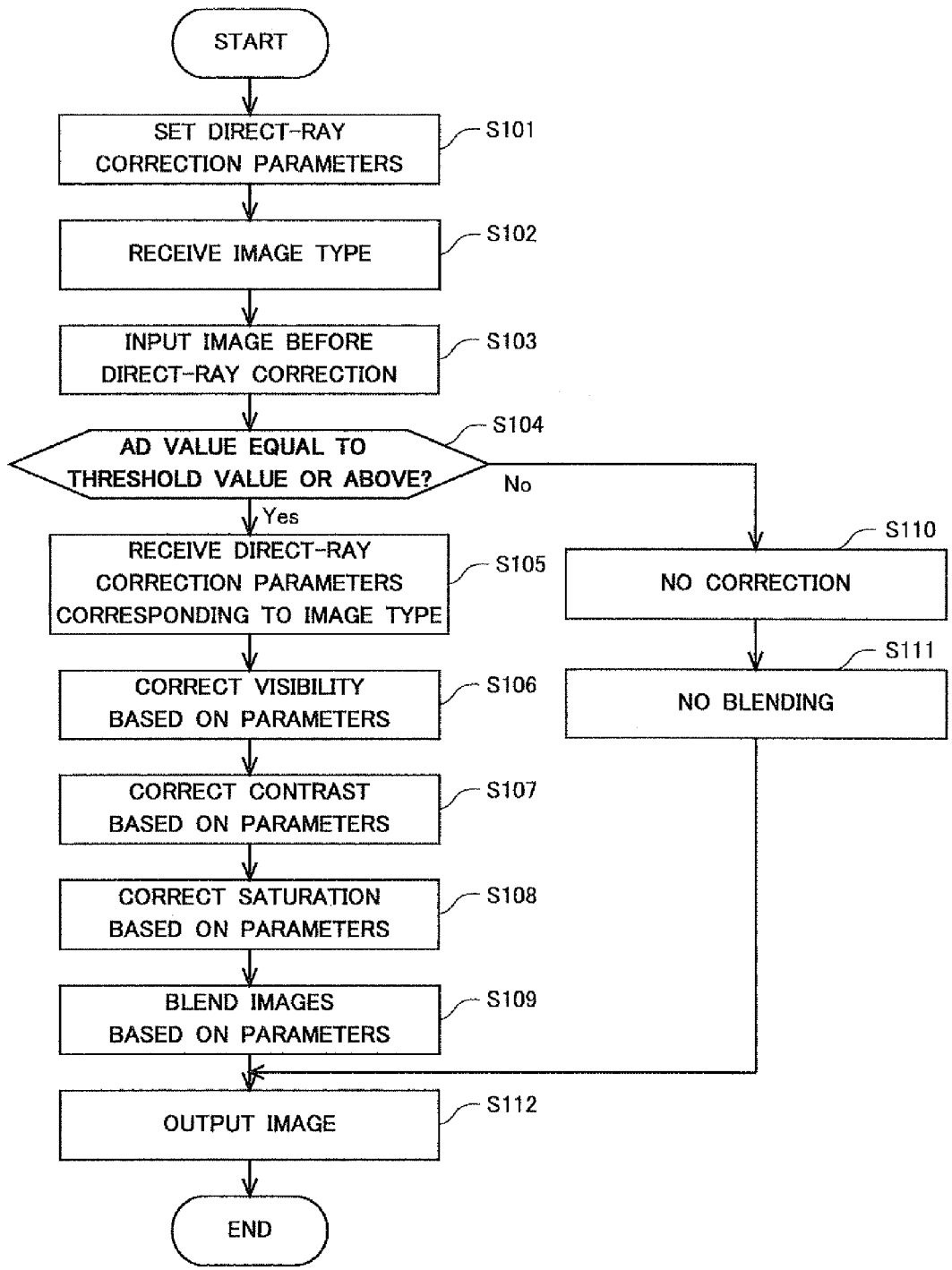
FIG. 7 shows a flowchart of processing on an image processing circuit of the first embodiment.

Next, the processing by the image processing circuit 10 of the first embodiment will be described based on FIG. 7. FIG. 7 shows a flowchart of processing on the image processing circuit 10 of the first embodiment.

As shown in FIG. 7, the image processing circuit 10 starts when its power is turned on. Then, at the initial operation step just after the power is turned on, a set of the direct-ray correction parameters received from the CPU 20 is set (step S101). That is, the image processing circuit 10 stores the direct-ray correction data 13a in the memory 13.

Then, the image processing circuit 10 receives from the CPU 20 the data relevant to the image type for input (step S102), and inputs the image before the direct-ray correction from the image source corresponding to the image type (step S103).

Then, the image processing circuit 10 judges whether the display 40 is exposed to outside light, that is, whether or not the AD value is equal to the predetermined threshold value or above (step S104). Here, in the case where the image processing circuit 10 judges that the AD value is equal to the predetermined threshold value or above (Yes in step S104), the image processing circuit 10 receives the direct-ray correction parameters corresponding to the image type from the direct-ray correction data 13a (step S105).

Then, the image processing circuit 10, based on the received direct-ray correction parameters, corrects visibility (step S106), corrects contrast (step S107), and corrects saturation (step S108). Then, the image processing circuit 10 blends the images based on the direct-ray correction parameters (step S109). Although not shown in FIG. 7, in the case where the direct-ray correction parameters include a backlight parameter, the image processing circuit 10 controls a backlight.

In the case where the image processing circuit 10 judges that the AD value is lower than the threshold value (No in step S104), the image processing circuit 10 corrects none of visibility, contrast and saturation (step S110). The image processing circuit 10 does not blend any images (step S111).

Then, the image processing circuit 10 outputs images to the display 40 (step S112), and terminates the flow of processing.

Figure 8:
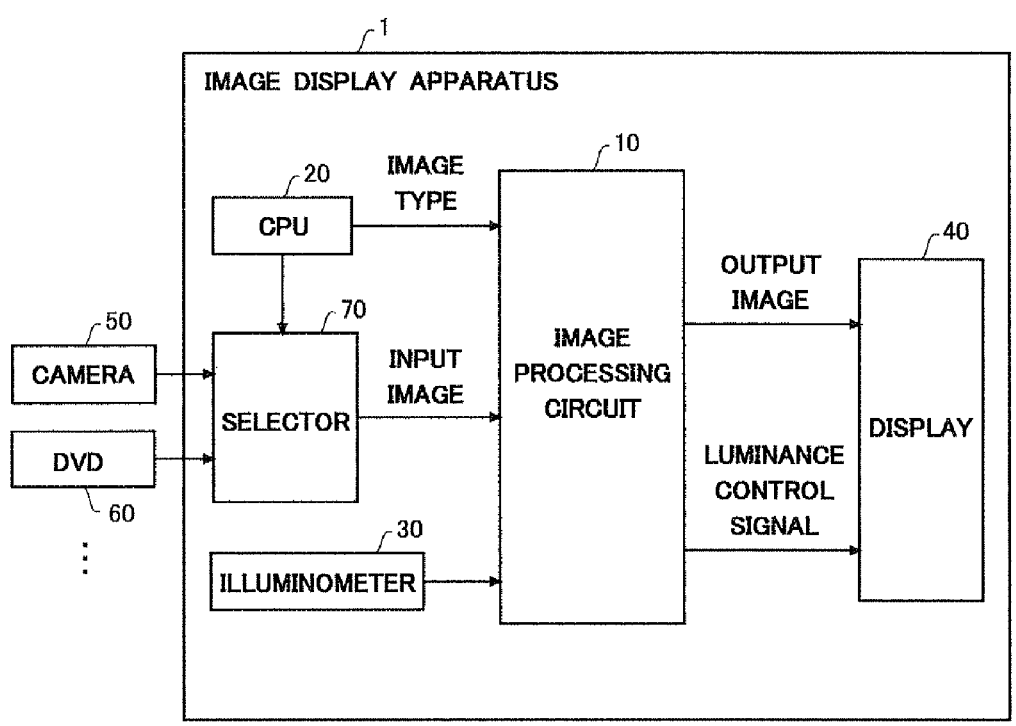
FIG. 8 shows a block diagram of a system configuration including image sources and the image display apparatus equipped with the image processing circuit of the first embodiment.

Here is a description of the image display apparatus 1 equipped with the image processing circuit 10 of the first embodiment described above based on FIG. 8. FIG. 8 shows a block diagram of a system configuration including the image sources and the image display apparatus 1 equipped with the image processing circuit 10 of the first embodiment.

FIG. 8 shows the components only required for description of the characteristics of the image display apparatus 1, and shows no general components. FIG. 8 uses the same reference numbers as the ones for components identical with the components of the image processing circuit 10 of the first embodiment shown in FIG. 2. Therefore, the components identical with the ones in FIG. 2 will be simply described, or the description itself will be omitted.

As shown in FIG. 8, the image display apparatus 1 includes the image processing circuit 10, the CPU 20, the illuminometer 30, the display 40 and a selector 70. The image display apparatus 1 is also connected individually to the image sources such as a camera 50 and a DVD 60 that are disposed outside the image display apparatus 1. The image sources may be disposed inside the image display apparatus 1.

The CPU 20 is a central processing unit that controls the entire image display apparatus 1. The CPU 20 also transmits selection instruction data regarding an image source to the selector 70, as well as transmitting data such as the image type to the image processing circuit 10.

The illuminometer 30 is disposed near the display 40 and detects illuminance in the area near the display 40. A plurality of the illuminometers 30 may be disposed.

The selector 70 selects an image source based on the selection instruction data transmitted from the CPU 20. Then, the selector 70 outputs an image signal of the selected image source to the high-definition processor 12b of the image processing circuit 10. The image processing circuit 10 performs direct-ray correction regarding the image signal transmitted from the selector 70.

As above, the parameter receiver of the first embodiment receives direct-ray correction data corresponding to the image type of the image-before-correction, and transmits the data to direct-ray corrector, the blender and the backlight controller as parameters. The image processing circuit is configured so that the direct-ray corrector corrects the image-before-correction by use of the parameters; the blender blends the image-before-correction and the image-after-correction by use of the parameters; and the backlight controller controls the luminance of the backlight by use of the parameters. Therefore, this configuration allows visibility to be ensured even under direct sunlight, when the visibility of the display image must be ensured.

3. Second Embodiment

In the first embodiment described above, the direct-ray correction corresponding to the image type is performed after the parameter relevant to the direct-ray correction is set for each image type. However, the method is not limited to the one above. In an example, after plural parameters relevant to the direct-ray correction are set for each image type, the direct-ray correction may be performed by use of the appropriate parameter data among the plural levels of parameters in accordance with the illuminance. Hereinafter, the second embodiment will be described.

3-1. Configuration of Image Display Apparatus

Figure 9:
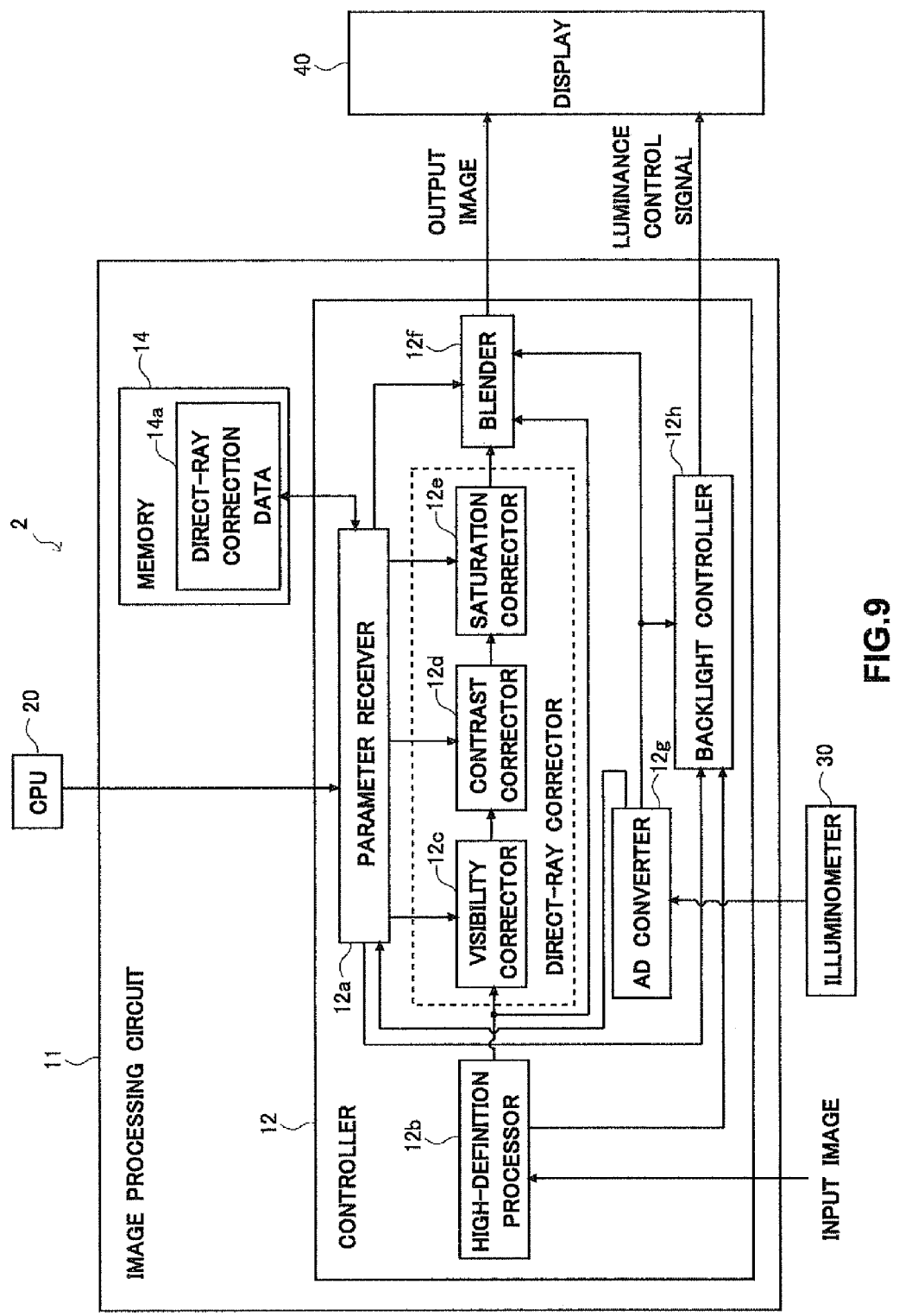
FIG. 9 shows a configuration block diagram of an image display apparatus of the second embodiment.

FIG. 9 shows a configuration block diagram of image display apparatus 2 of the second embodiment. Regarding the components of the second embodiment, FIG. 9 uses the same reference numbers as the ones for components identical with the components shown in FIG. 2. Therefore, such a component may have no description.

As shown in FIG. 9, the image display apparatus 2 includes a CPU (Central Processing Unit) 20, an illuminometer 30, a display 40 and an image processing circuit 11.

The image processing circuit 11 includes a controller 12 and a memory 14, and may be configured as an ASIC (Application Specific Integrated Circuit). FIG. 9 shows the components only required for description of the characteristics of the image processing circuit 11, and shows no general components.

The memory 14 includes a memory device such as a nonvolatile memory or a register, and stores direct-ray correction data 14a. The direct-ray correction data 14a includes a set of parameters relevant to the direct-ray correction used by each processor including a visibility corrector 12c, a contrast corrector 12d, a saturation corrector 12e, a blender 12f and a backlight controller 12h.

Each of the parameters of the direct-ray correction data 14a is stored in such a manner that each of the parameters corresponds to the type of the input image. In the setting of the second embodiment, one image type has plural sets of parameters relevant to the direct-ray correction. The direct-ray correction data 14a is stored by a parameter receiver 12a at an initial operation step on an image processing circuit 10, such as when its power is turned on. However, the predetermined parameters may be stored in advance based on experimental results or the like.

Figure 10A:
FIG. 10A shows a combination example of a plurality of direct-ray correction parameters.
Figure 10B:
FIG. 10B shows another combination example of the plurality of direct-ray correction parameters.
Figure 10C:
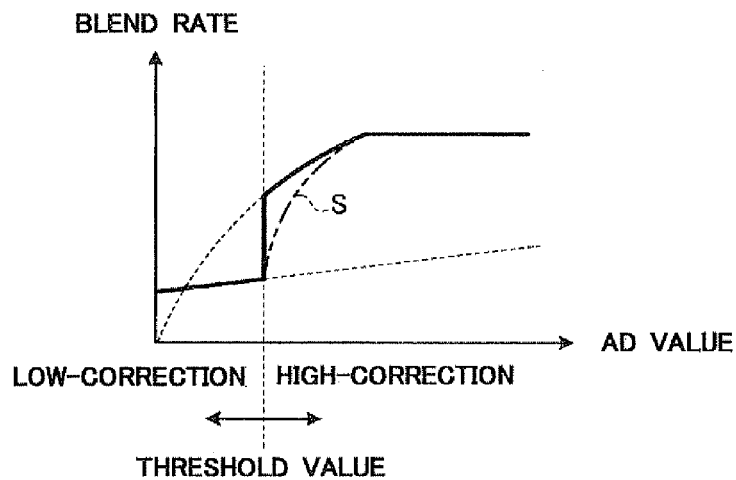
FIG. 10C shows another combination example of the plurality of direct-ray correction parameters.

Here, concrete setting examples of the direct-ray correction data 14a will be described based on FIG. 10A, FIG. 10B and FIG. 10C. FIGS. 10A to 10C show a combination example of plural sets of the direct-ray correction parameters.

As shown in FIG. 10A and FIG. 10B, the image processing circuit 11 of the second embodiment sets the plural sets of parameters relevant to the direct-ray correction for one image type (here, for "camera").

In the example of FIG. 10A, the image processing circuit 11 sets the direct-ray correction parameters at a relatively "low" level of the direct-ray correction (hereinafter, referred to as "low-correction parameters") as the direct-ray correction data 14a.

On the other hand, in the example of FIG. 10B, the image processing circuit 11 sets the direct-ray correction parameters at a relatively "high" level of the direct-ray correction (hereinafter, referred to as "high-correction parameters") as the direct-ray correction data 14a.

Then, as shown in FIG. 10C, the image processing circuit 11 performs the direct-ray correction based on the low-correction parameters in the case where the AD value is lower than the predetermined threshold value; and performs the direct-ray correction based on the high-correction parameters in the case where the AD value is equal to the predetermined threshold value or above.

Differently from the case of the image processing circuit 10 of the first embodiment, in the case of the image processing circuit 11 of the second embodiment, the data regarding the AD value output from the illuminometer 30 through an AD converter 12g is also transmitted to the parameter receiver 12a.

The parameter receiver 12a that has received the data regarding the AD value makes a threshold-value judgment regarding the AD value and switches between the low-correction parameters and the high-correction parameters based on the judgment result.

This enables the visibility to be ensured corresponding to the changes in the state of the screen of the display 40 exposed to outside light during driving, such as whether the entire or a part of the screen of the display 40 is exposed to outside light, or whether the outside light is direct sunlight received in town or indirect sunlight received through trees in a mountain.

As shown in FIG. 10C, the blend rate curve may be changed to a moderated curve (refer to a two-dot chain line S in FIG. 10C) at switching between the low-correction parameters and the high-correction parameters. This is intended to moderate the drastic change on the blend rate curve at the correction switching (refer to the solid line on the dashed axis line of "threshold value" in FIG. 10C).

In FIGS. 10A to 10C, correction switching between two levels of the low-correction and the high-correction is described. However, it is not limited to this case. The correction switching in three or more levels may be performed.

3-2. Processing on Image Processing Circuit

Figure 11:
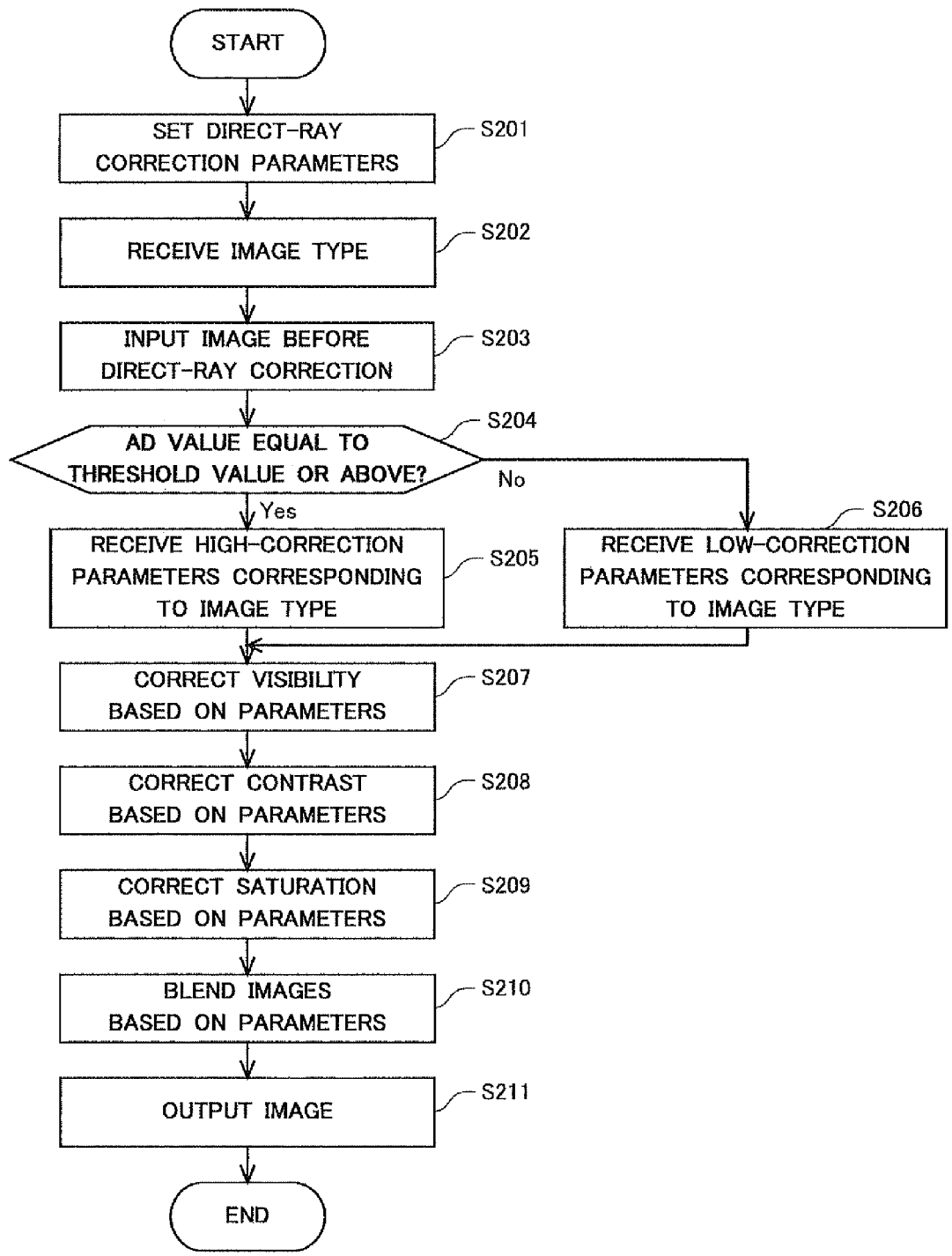
FIG. 11 shows a flowchart of processing on an image processing circuit of the second embodiment.

Next, the processing of the image processing circuit 11 of the second embodiment will be described based on FIG. 11. FIG. 11 shows a flowchart of processing on the image processing circuit 11 of the second embodiment. Although some steps of the processing are identical with the ones shown in FIG. 7 regarding the image processing circuit 10 of the first embodiment, the steps of the processing are also renumbered and will be described again.

As shown in FIG. 11, the image processing circuit 11 starts when its power is turned on. Then, at the initial operation step just after the power is turned on, the sets of the direct-ray parameters received from the CPU 20 are set (step S201).

That is, the image processing circuit 11 stores the direct-ray correction data 14a in the memory 14.

Then, the image processing circuit 11 receives the data relevant to the image type for input from the CPU 20 (step S202), and inputs the image before direct-ray correction from the image source corresponding to the image type (step S203).

Then, the image processing circuit 11 judges whether the display 40 is exposed to outside light, that is, whether the AD value is equal to the predetermined threshold value or above (step S204). Here, in the case where the image processing circuit 11 judges that the AD value is equal to the predetermined threshold value or above (Yes in step S204), the image processing circuit 11 receives the high-correction parameters corresponding to the image type form the direct-ray correction data 14a (step S205).

On the other hand, in the case where the image processing circuit 11 judges that the AD value is lower than the threshold value (No in step S204), the image processing circuit 11 receives the low-correction parameters corresponding to the image type from the direct-ray correction data 14a (step S206).

Then, the image processing circuit 11, based on the received direct-ray correction parameters, corrects visibility (step S207), corrects contrast (step S208), and corrects saturation (step S209). Then, the image processing circuit 11 blends the images based on the direct-ray correction parameters (step S210). Although not shown in FIG. 11, in the case where the direct-ray correction parameters include a backlight parameter, the image processing circuit 11 controls a backlight.

Then, the image processing circuit 11 outputs images to the display 40 (step S211), and terminates the flow of the processing.

4. Variation

So far, the display 40 having one display area has been described. However, the display 40 may have a plurality of display areas. In this case, direct-ray correction is performed only on the specified display area.

Figure 12:
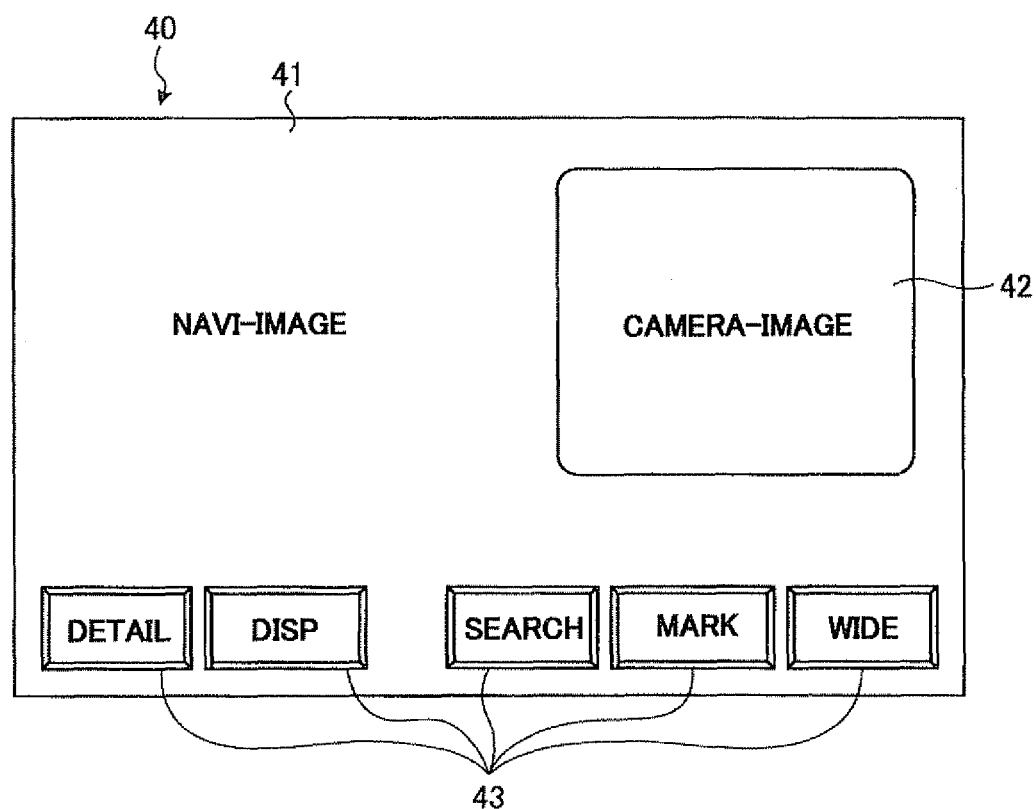
FIG. 12 shows a variation example having a plurality of display areas.

Here is a description of the variation in FIG. 12. FIG. 12 shows an example of the variation having the plurality of display areas.

As shown in FIG. 12, in some cases, a display 40 included in a car navigation system or the like may have a plurality of display areas. The display 40 shown in FIG. 12 has a display area 41 for a navigation image (Navi-image), a display area 42 for a camera-captured image and a display area including a plurality of software switches 43 that are operation parts controlled by software.

In this case, the direct-ray correction shall be performed only to the display area 42 for the camera-captured image that deeply influences vehicle safety. As a concrete example providing this correction, after respective processors such as the direct-ray corrector (refer to FIG. 2 or FIG. 9) are set so as to function in parallel for a plurality of systems depending on the display areas, a parameter receiver 12a transmits the data of the direct-ray parameters only to respective processors in the system corresponding to the display area 42 for the camera-captured image.

This enables the visual impressions such as color tones on navigation image to be given priority, and the visibility on the camera-captured image that influences safety to be given priority. That is, this enables the image correction to be suitable for respective display areas, while keeping their characteristics.

As above, the image processing circuit and the image display apparatus of the invention contribute to ensuring visibility even under direct sunlight in the case where the visibility must be ensured, and they are suitable especially as an in-vehicle image processing circuit and in-vehicle image display apparatus under the visibility conditions that vary drastically due to outside light reception or other causes.

While the invention has been shown and described in detail, the foregoing description is in all aspects illustrative and not restrictive. It is therefore understood that numerous other modifications and variations can be devised without departing from the scope of the invention.

What is claimed is:

1. An image processor comprising:
   a type receiver that receives information of a type of an input image;
   a corrector that performs a correction to the input image in accordance with an illuminance in an area near a display that displays the input image and the information of the type of the input image, wherein
      the corrector changes a degree of the correction for the input image based on the illuminance in the area near the display in accordance with the information of the type of the input image, and
      the degree is different for different types of the input image; and
   a blender that blends the input image and an image-after-correction that has been corrected based on the illuminance in the area near the display, wherein
      the blender blends the input image and the image-after-correction in accordance with a blend rate curve, the blend rate curve being different for the different types of the input image.

2. An image display apparatus comprising:
   a display on which an input image is displayed;
   an illuminometer that detects an illuminance in an area near the display;
   a type receiver that receives information of a type of the input image;
   a corrector that performs a correction to the input image in accordance with the illuminance in the area near the display and the information of the type of the input image, wherein
      the corrector changes a degree of the correction for the input image based on the illuminance in the area near the display in accordance with the information of the type of the input image, and
      the degree is different for different types of the input image; and
   a blender that blends the input image and an image-after-correction that has been corrected based on the illuminance in the area near the display, wherein
      the blender blends the input image and the image-after-correction in accordance with a blend rate curve, the blend rate curve being different for the different types of the input image.

* * * * *